United States Patent

Stevens et al.

[15] 3,658,349
[45] Apr. 25, 1972

[54] DAMPING DEVICE FOR A MECHANICAL FLUID SEAL

[72] Inventors: Justus Bickford Stevens, East Providence; Walter William Meyer, Warwick, both of R.I.; John Sinclaire Howland, Framingham, Mass.

[73] Assignee: Sealol, Inc., Warwick, R.I.

[22] Filed: Dec. 3, 1970

[21] Appl. No.: 94,801

Related U.S. Application Data

[62] Division of Ser. No. 793,431, Jan. 23, 1969.

[52] U.S. Cl. .............................................. 277/89
[51] Int. Cl. ............................................ F16j 15/36
[58] Field of Search .............. 277/81, 89, 88, 90, 71, 74, 277/75

[56] References Cited

UNITED STATES PATENTS

| 3,356,378 | 12/1967 | Tracy | 277/81 |
| 2,094,160 | 9/1937 | Oldberg | 277/81 |
| 2,115,346 | 4/1938 | Summers | 277/81 X |

Primary Examiner—Robert I. Smith
Attorney—William Frederick Werner

[57] ABSTRACT

This specification discloses a damping device for a bellows employed in a mechanical fluid seal. The seal comprises a mating and a sealing ring. One of said rings is anchored to a stationary housing with the other ring being drivably connected to a shaft rotatably mounted in the housing. A bellows is employed to urge one ring into engagement with the other ring.

This invention relates to damping means and more specifically to means for removing the vibrations, dancing and gathering of the convolutions in a bellows employed in a mechanical fluid seal.

3 Claims, 9 Drawing Figures

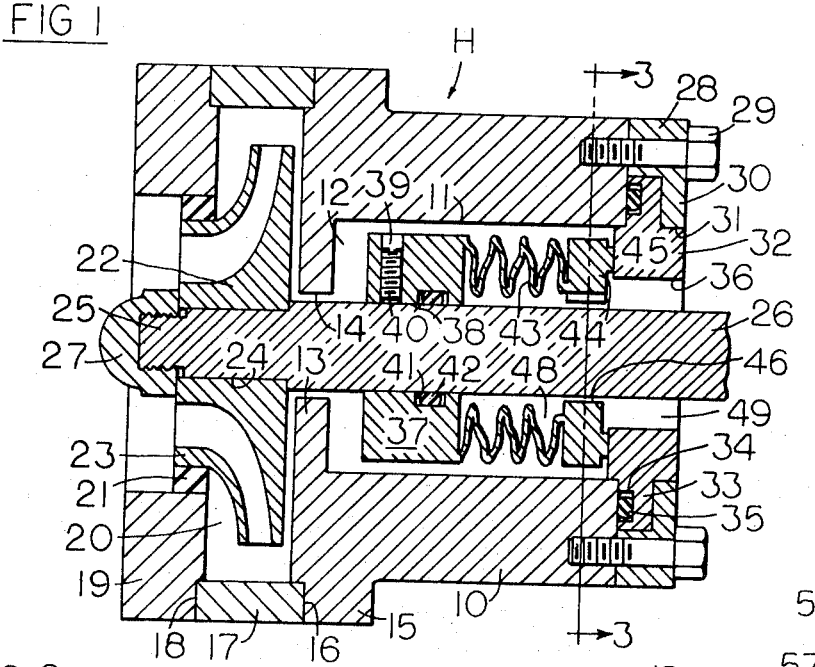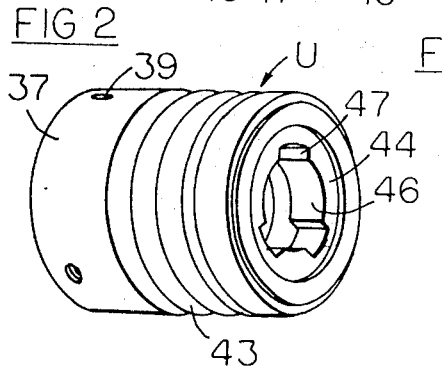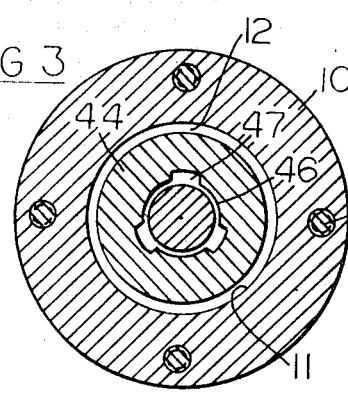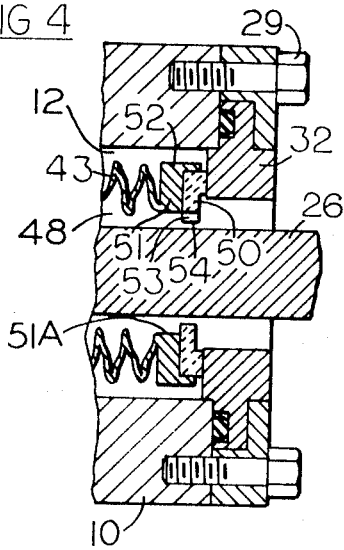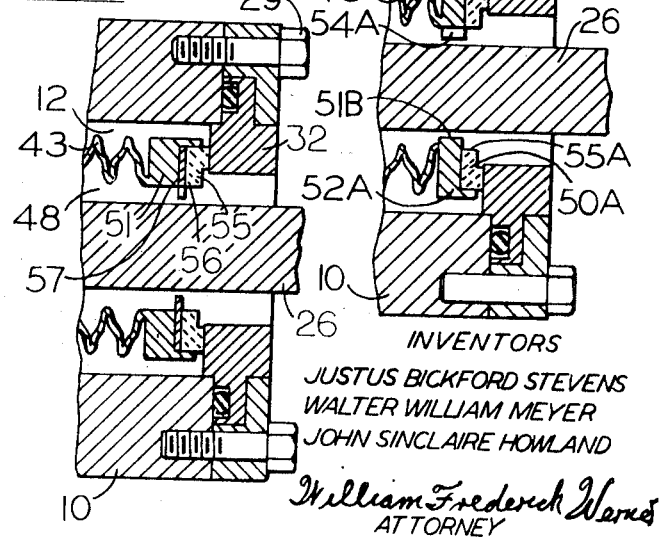

INVENTORS
JUSTUS BICKFORD STEVENS
WALTER WILLIAM MEYER
JOHN SINCLAIRE HOWLAND

*William Frederick Werner*
ATTORNEY

DAMPING DEVICE FOR A MECHANICAL FLUID SEAL

This application is a division of U.S. Pat. application Ser. No. 793,431 filed Jan. 23, 1969.

Mechanical fluid seals provide for fluid tight integrity at the interfaces of the sealing ring and mating ring. Resilient members, such as coil springs or expansible bellows surround a rotating shaft; are fastened to a housing or anchor member on one end and retain a sealing ring on the other end. A mating ring fastened to the housing is engaged by the sealing ring adapted to rotate with the shaft. The coil spring or expansible bellows urge the sealing ring into engagement with the mating ring to create a fluid seal therebetween; termed the interfaces.

Mechanical fluid seals are used in pumps. When certain pumps are started they operate dry for a short period until flooded. Under this condition, the mechanical fluid seal is not provided lubrication by the fluid pumped and therefore runs dry. The extraordinary friction at the seal faces under this condition can produce eccentricity of the seal ring with an imbalance of forces developing severe axial vibration and eventual failure in the expansible bellows member.

It is therefore an object of the present invention to provide a construction, whereby the vibrations in a bellows are reduced to a minimum or removed entirely, so as to prolong the life of the bellows.

Other objects of the present invention will become apparent in part and be pointed out in part in the following specification and claims.

Referring to the drawings in which similar characters of reference indicate corresponding parts in all the figures:

FIG. 1 is a section through a rotary pump in which the housing and shaft is provided with a seal designed in accordance with the precepts of this invention.

FIG. 2 is a perspective of the unit comprising the anchor and mating rings and the bellows therebetween.

FIG. 3 is a section taken normal to the showing of FIG. 1 and about on the plane represented by the line 3—3 of FIG. 1.

FIG. 4 is a detailed section comparable to FIG. 1 of one modification.

FIG. 5 is another detailed section comparable to FIGS. 1 and 4 of another modification.

FIG. 6 is a perspective of the washer of FIG. 5 per se.

FIG. 7 is another detailed section comparable to FIG. 4 of another modification.

Figure 8:
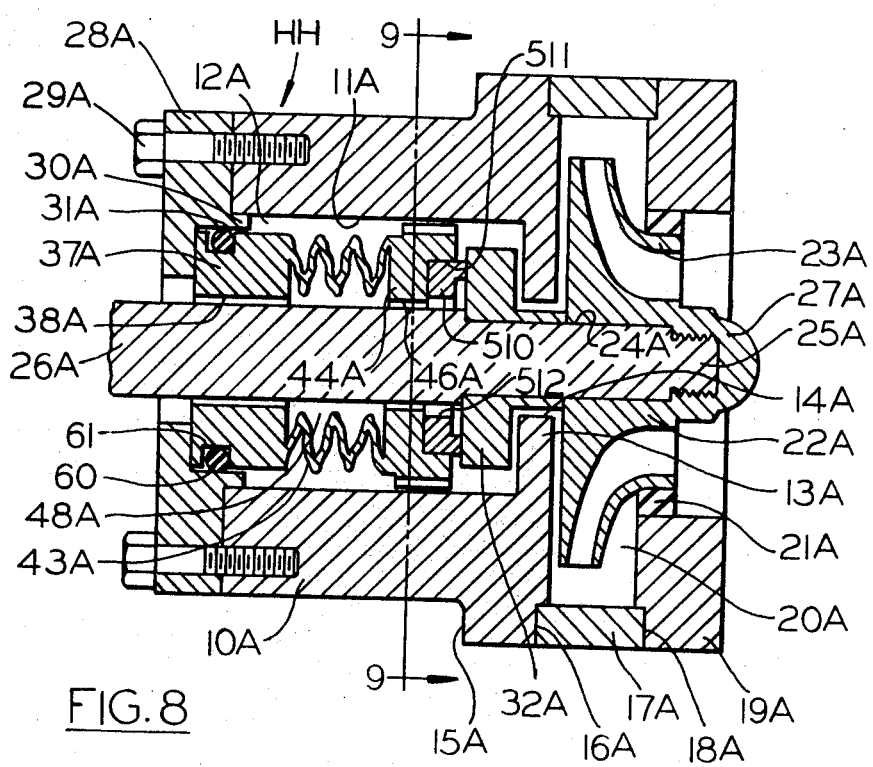
FIG. 8 is another detailed section comparable to FIG. 4 of still another modification.

Referring now to the drawing, and first more particularly to FIGS. 1, 2 and 3, a housing is identified in its entirety by the reference character H. It comprises a main body member 10 which ordinarily will be cylindrical and has an inner cylindrical surface 11 defining a chamber 12. Extending inwardly from one end of body 10 is a flange 13 presenting a central opening 14. At the same end the body 10 is formed with a short outwardly extending flange 15 the outer end of which is cut away to provide an annular external recess 16.

An annulus 17 has one end received in recess 16 and its other end in a similar recess 18 formed in a pump chamber end plate 19. The latter is spaced from body 10 and flange 13 and cooperates with these elements and annulus 17 in defining a pump chamber 20. A bearing 21 is provided in plate 19. An impeller 22 is provided with a neck 23 journalled in the bearing 21 and a central opening 24 in which is fitted the reduced end portion 25 of a shaft 26. The end portion 25 is threaded and screwed thereonto is a nut 27 that secures the impeller 22 on shaft 26.

A housing end plate 28 is affixed to the end of body 10 by headed screwbolts 29. End plate 28 has an inwardly extending flange 30 that is spaced from the confronting face of body 10 and is formed with a central opening 31. A mating ring 32 is fitted into opening 31 which aligns with body surface 11 and has an external flange 33 received in the space between flange 30 and body 10. It is secured in this position by the clamping action of the bolts 29. The flange 33 is formed with an annular groove 34 which opens onto the end face of body 10 and receives a packing member such as an O ring 35. The mating ring 32 has a bore 36 through which shaft 26 passes.

A bellows assembly or unit is shown in detail in FIG. 2 and is designated generally U. It comprises an anchor ring 37 having a bore 38 which received shaft 26. A plurality of radial threaded passages 39 are formed in anchor ring 37 and open onto bore 38. Set screws 40 are screwed into these passages and securely position the ring 37 on shaft 26. A groove 41 is formed in ring 37 opening onto bore 38. An O ring 42 is received in groove 41.

A metallic bellows 43, comprising a plurality of convolutions, has one end secured to anchor ring 37 and its other end to a sealing ring 44. The latter has an interface 45 in engagement with the corresponding interface of mating ring 32.

As shown in FIGS. 1, 2, and 3 the sealing ring 44 has a bore 46 which receives, and is very slightly spaced from shaft 26. It will be observed, with reference to FIG. 1, that whirl vibration of sealing ring 44 will result in lateral or sidewise movement. If unrestrained, this movement will result in separation between interfaces 45 and 32 with loss of fluid tight integrity. This movement also causes lateral and axial vibration of the bellows convolutions 43 which, due to the high frequency of movement, causes cracking and destruction of the convolutions by fatique.

Bore 46 is spaced from shaft 26 with a clearance in thousandths of an inch, so that bore 46 has limited movement about shaft 26. This limited movement prevents sealing ring 44 from vibrating beyond a minimum amount thus avoiding severe vibrations in convolutions 43.

Sealing ring 44 is provided with a plurality, in this instance three, angularly spaced arcuate recesses 47, for reasons which will presently appear.

Under conditions of one form of use, pressure obtains on the pump side of the seal. Fluid under this pressure passes through the opening 14 into housing chamber 12. The fluid is effective on the exterior of the bellows to cause the convolutions 43 to urge the interfaces of the rings 32 and 44 into sealing engagement.

The interior bellows chamber is designated 48. Access to the bellows chamber 48 that may be provided by the clearance between bore 46 and shaft 26 is supplemented by the recesses 47.

During other conditions of use when it may be desired to do so, fluid under pressure may be admitted from the side 49 through recesses 47 into bellows chamber 48. The fluid is effective on the interior of the bellows to cause the convolutions 43 to urge the interfaces of the rings 32 and 44 into sealing engagement.

In any event, when the fluid is in chamber 12 exterior of the bellows, or in chamber 48 interior of the bellows, or in both chambers 12 and 48, the fluid damps the vibration of the convolutions.

The present structure is directed to bellows in use when the fluid is under no pressure, or at a time when there is no fluid in either chamber 12 or 48, as when the pump starts to operate. At such time the convolutions 43 and sealing ring 44 start to vibrate and the rings 32, 44 at the interface, separate so as to destroy fluid tight integrity at the interfaces.

The fluid must have rapid access into chamber 48 so as to damp vibrations in the convolutions 43 and also to expand the convolutions 43 so as to force sealing ring 44 into engagement with mating ring 32 to establish fluid tight integrity at the interfaces.

In-as-much as sealing ring 44 is suspended from the end of expansible and therefore flexible bellows 43, and rotates; it will rotate eccentrically about shaft 26 unless and until fluid flows into chamber 48.

The width of sealing ring 44 and the width of recesses 47 hinder the rapid flow of fluid past ring 44 and into chamber 48 causing a seepage rather than a flow. This same condition may be created by fluids of high viscosity which require recesses of greater area over fluids of a lower viscosity.

FIG. 4 illustrates a modified form of sealing ring so as to provide a shorter recess passage for the fluid. It also permits the interface of the sealing ring to consist of a variety of materials, different from the material of the sealing ring.

The modified form consists of a sealing ring 51 provided with a skirt-like flange 52 which encompasses a gasket 50 provided with recesses 53 which open onto the bore 54 thereof. The gasket 50 engages the mating ring 32 to form one part of the interface. The gasket 50 is preferably of a material such as graphite which has properties that adapt it to a particular environment. The bore 51A of sealing ring 51 provides ample clearance around shaft 26 so as to provide an unrestricted fluid passageway.

The device of FIG. 4 functions in the same way as that of FIGS. 1, 2 and 3 as described above.

FIG. 7 illustrates another modified form in which the recesses 54A are provided in sealing ring 52A and gasket 50A is provided with a bore 55A which provides an unrestricted passageway around shaft 26. The bore 51B provides a minimum clearance around shaft 26. That clearance is in the nature of between 0.002 and 0.005 of an inch in a diameter greater than the diameter of shaft 26.

In FIGS. 5 and 6 a further modification is depicted. In this form mating ring 32 and sealing ring 51 are the same as in FIG. 4. However, gasket 55 has a bore 56 spaced from shaft 26. There are no recesses opening into the bore 56 of the gasket as in FIG. 4. A disc-like washer 57 (FIG. 6) is interposed between mating ring 51 and gasket 55. This washer 57 has a central opening or bore 58 onto which open recesses 59. The latter provide access to the bellows chamber 48.

The disc-like washer 57, being very thin, permits a greater eccentric movement of the sealing ring 50 so that said sealing ring can be self centering upon mating ring 32 and thereby provide less clearance between the outside diameter of shaft 26 and central opening or bore 58 than would be necessary between bore 46 and shaft 26 as shown in the form of FIGS. 1, 2 and 3. Bore 58 permits the least vibration in sealing ring 51 because of its close proximity to the outside diameter of shaft 26.

It is obvious that washer 57 may be fabricated from a variety of materials other than the material used for sealing ring 51.

It will therefore be observed that the structures described limit the vibration of the bellows and the concomitant dancing and gathering of the convolutions which produce fatique and breaks in the convolutions while permitting the convolutions to expand and contract in their normal and usual function. The radial movement of the sealing rings is limited by the close clearance of the bores around the shaft 26.

Figure 9:
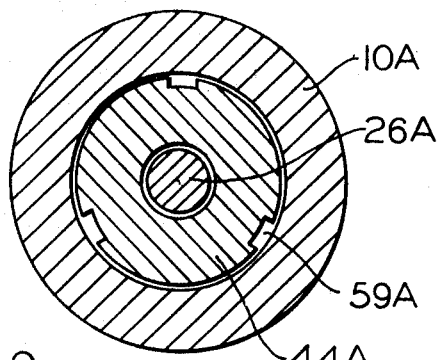
FIG. 9 is a vertical cross sectional view taken on line 9—9 of FIG. 8.

FIGS. 8 and 9 illustrate a structure in which the mating ring 32A rotates with the shaft and the sealing ring 44A and gasket 510 are stationary. This structure is the reverse of that shown in FIGS. 1 thru 7 wherein the mating ring 32 is stationary and the sealing ring 44 rotates.

The housing HH comprises a main body 10A provided with an inner cylindrical surface 11A defining a chamber 12A. Extending inwardly from one end of body 10A is a flange 13A having a central opening 14A. At the same end, the body 10A is formed with a short outwardly extending flange 15A the outer end of which is cut away to provide an annular external recess 16A.

An annulus 17A has one end received in recess 16A and its other end in a similar recess 18A formed in a pump chamber end plate 19A. The latter is spaced from body 10A and flange 13A and cooperate with these elements and annulus 17A in defining a pump chamber 20A. A bearing 21A is provided in plate 19A. An impeller 22A is provided with a neck 23A journalled in the bearing 21A and a central opening 24A in which is fitted the reduced end portion 25A of a shaft 26A. The end portion 25A is threaded and screwed thereonto is a nut 27A that secures the impeller 22A on shaft 26A.

A housing end plate 28A is affixed to the end of body 10A by headed screw bolts 29A. End plate 28A has an inwardly extending flange 30A that is spaced from the confronting face of body 10A and is formed with a central opening 31A. An anchor ring 37A having a bore 38A which is spaced from shaft 26A, is fitted into opening 31A and is secured in position by a drive fit. An O ring 60 is located in a circular recess 61 in ring 37A and engages opening 31A in fluid tight relationship.

A metallic bellows 43A, comprising a plurality of convolutions, has one end secured to anchor ring 37A and its other end to a sealing ring 44A provided with a skirt-like flange 511 which encompasses the gasket 510 provided with a bore 512 which provides ample clearance around shaft 26A.

A mating ring 32A is fastened to shaft 26A to rotate therewith.

The gasket 510 engages the mating ring 32A to form fluid tight interface engagement.

The bore 46A of sealing ring 44A provides a restricted passageway around shaft 26A into chamber 48A. Sealing ring 44A is provided with a plurality of recesses 59A which open onto bore 46A.

The modified form shown in FIGS. 8 and 9 functions in a manner similar to operation described for FIGS. 1, 2 and 3 except that mating ring 32A rotates with the shaft and anchor ring 37A, bellows 48A, sealing ring 44A and gasket 510 do not rotate with the shaft.

Having shown and described preferred embodiments of the present invention by way of example, it should be realized that structural changes could be made and other examples given without departing from either the spirit or scope of this invention.

What I claim is:

1. A vibration damping device for a mechanical fluid seal comprising a housing provided with a housing chamber, a shaft rotatably mounted in said housing, a mating ring having a bore surrounding said shaft, means fastening said mating ring to said housing, an anchor ring drivably mounted on said shaft, a sealing ring, and an extensible bellows having an inside chamber and located in said housing chamber and mounted about said shaft and having one end secured to said anchor ring and the other end secured to said sealing ring, whereby, said expansible bellows yieldingly urges said sealing ring into engagement with said mating ring to provide a fluid seal, that improvement consisting of said sealing ring having an unrestricted clearance about said shaft, said sealing ring being provided with a skirt-like flange, a gasket, means securing said gasket to said skirt-like flange, said gasket and said mating ring being connected to said sealing ring and said housing respectively against radial movement in at least one direction, said gasket having a bore of a diameter having a restricted clearance about said shaft, a recess opening in said bore to provide a fluid passageway through said gasket, said gasket being interposed between said sealing ring and mating ring for engagement with said mating ring and constituting part of the sealing ring, said restricted clearance restricting the amplitudes of vibration of said sealing ring about said shaft.

2. A vibration damping device for a mechanical fluid seal comprising a housing provided with a housing chamber, a shaft rotatably mounted in said housing, a mating ring having a bore surrounding said shaft, means fastening said mating ring to said housing, an anchor ring drivably mounted on said shaft, a sealing ring, and an extensible bellows having an inside chamber and located in said housing chamber and mounted about said shaft and having one end secured to said anchor ring and the other end secured to said sealing ring, whereby said expansible bellows yieldingly urges said sealing ring toward said mating ring, that improvement consisting of said sealing ring having an unrestricted clearance about said shaft, said sealing ring being provided with a skirt-like flange, a gasket, means securing said gasket to said skirt-like flange, whereby, said gasket engages said mating ring, said gasket having a bore of a diameter having an unrestricted clearance about said shaft, and a disc-like washer having a central opening and a recess connected to said central opening, said central opening being of a diameter about said shaft to provide a restricted passageway between said shaft and central opening, and means fastening said disc-like washer between said sealing ring and said gasket, to form a unitary structure, said washer and said mating ring being connected to said sealing ring and said housing against radial movement at least in one direction: said restricted passageway restricting the amplitudes of vibration of said sealing ring about said shaft.

3. A vibration damping device for the mechanical fluid seal of claim 2, in which, said disc-like washer has a width of between 0.001 and 0.020 of an inch.

* * * * *